United States Patent
Fang et al.

(10) Patent No.: US 8,956,106 B2
(45) Date of Patent: Feb. 17, 2015

(54) ADAPTIVE EDUCTOR SYSTEM

(75) Inventors: Ning Fang, Mason, OH (US); Benjamin Joseph Simpson, Mason, OH (US); Duane Howard Anstead, Fairfield, OH (US); Adam Mitchell Record, Liberty Twp, OH (US); Donald James Welty, Milford, OH (US)

(73) Assignee: General Electric Company, Schenectady, NY (US)

( * ) Notice: Subject to any disclaimer, the term of this patent is extended or adjusted under 35 U.S.C. 154(b) by 680 days.

(21) Appl. No.: 13/331,062

(22) Filed: Dec. 20, 2011

(65) Prior Publication Data
US 2013/0156547 A1   Jun. 20, 2013

(51) Int. Cl.
*F01D 25/18* (2006.01)
*F01D 11/04* (2006.01)
*F02C 7/06* (2006.01)

(52) U.S. Cl.
CPC ............. *F01D 11/04* (2013.01); *F01D 25/183* (2013.01); *F02C 7/06* (2013.01)
USPC ............................ 415/117; 415/112; 184/6.11

(58) Field of Classification Search
CPC ......... F01D 11/04; F01D 25/183; F02C 7/06; F05D 2260/601; F05D 2260/609; F05D 2270/301
USPC .................... 415/17, 110–112; 184/6.4, 6.11; 60/39.08, 782, 785
See application file for complete search history.

(56) References Cited

U.S. PATENT DOCUMENTS

| | | | |
|---|---|---|---|
| 3,722,624 A * | 3/1973 | Buckland | ..................... 184/6.11 |
| 4,182,119 A | 1/1980 | Hurley | |
| 4,655,698 A | 4/1987 | Winyard | |
| 5,429,208 A | 7/1995 | Largillier et al. | |
| 5,611,661 A * | 3/1997 | Jenkinson | ..................... 415/112 |
| 7,584,619 B2 * | 9/2009 | Granitz et al. | ................... 60/785 |
| 8,146,342 B2 | 4/2012 | Judd | |
| 8,401,760 B2 * | 3/2013 | Payne et al. | ................... 701/100 |
| 2006/0059891 A1 | 3/2006 | Sheoran et al. | |
| 2007/0125092 A1 * | 6/2007 | Wolfe et al. | ..................... 60/782 |

(Continued)

FOREIGN PATENT DOCUMENTS

| | | |
|---|---|---|
| DE | 102008031186 A1 | 1/2010 |
| EP | 1316678 A2 | 6/2003 |

(Continued)

OTHER PUBLICATIONS

Search Report and Written Opinion from PCT/US2012/068371 dated Oct. 10, 2013.

*Primary Examiner* — Nathaniel Wiehe
*Assistant Examiner* — Woody A Lee, Jr.
(74) *Attorney, Agent, or Firm* — General Electric Company; Pamela A. Kachur

(57) ABSTRACT

An apparatus is provided having a first zone with a fluid flow at a first pressure, and a second zone with a fluid flow at a second pressure. A sump cavity is provided in fluid communication with the first zone and a sump vent. An eductor system may be provided with a fluid flow path therethrough and in fluid communication with the second zone and the sump vent. The eductor system may be provided with an altitude sensing valve and may also be provided with gage pressure sensing valve. The eductor system may further be provided with a second gage pressure sensing valve and may also be provided with an orifice plate. The gage pressure sensing valves may react to the gage pressure of the second zone.

20 Claims, 3 Drawing Sheets

(56) References Cited

U.S. PATENT DOCUMENTS

2009/0288384 A1    11/2009   Granitz et al.
2010/0143094 A1    6/2010   Pisseloup et al.
2011/0005237 A1    1/2011   Matteson et al.

FOREIGN PATENT DOCUMENTS

| | | |
|---|---|---|
| EP | 1780124 A2 | 5/2007 |
| EP | 2146058 A1 | 1/2010 |
| GB | 2493835 A | 2/2013 |

* cited by examiner

ADAPTIVE EDUCTOR SYSTEM

BACKGROUND

The disclosed embodiments generally pertain to gas turbine engines, and particularly to adaptive eductor systems featured for sump seal pressurization.

SUMMARY

A first embodiment of the present invention provides a sump pressurization and eductor system provided with a first zone having a fluid flow at a first pressure, and a second zone having a fluid flow at a second pressure. A lubrication sump cavity is provided in fluid communication with the first zone and a sump vent. The eductor valve system may be provided with a fluid flow path therethrough and in fluid communication with the second zone and the sump vent. The eductor valve system may be provided with an altitude sensing valve and may also be provided with a gage pressure sensing valve.

Another embodiment of an eductor system may be provided with the altitude sensing valve in parallel through a fluid flow path with the gage pressure sensing valve. The gage pressure sensing valve may also be disposed in series through the fluid flow path with an orifice plate.

Another aspect of an eductor system may further be provided with a second gage pressure sensing valve in series in a fluid flow path with the altitude sensing valve.

Yet another aspect of the eductor system may be provided with an altitude sensing valve in parallel through a fluid flow path with a first gage pressure sensing valve, the altitude sensing valve may further be in series through the fluid flow path with a second gage pressure sensing valve. An orifice plate may also be in series through the fluid flow path with the first gage pressure sensing valve.

The gage pressure sensing valves may react to the gage pressure of the second zone.

BRIEF DESCRIPTION OF THE ILLUSTRATIONS

Embodiments of the invention are illustrated in the following illustrations.

DETAILED DESCRIPTION

A typical gas turbine engine generally possesses a forward end and an aft end with its several components following inline therebetween. An air inlet or intake is at a forward end of the engine. Moving toward the aft end, in order, the intake may be provided with a fan, which is followed by a compressor, a combustion chamber, a turbine, and a nozzle at the aft end of the engine. It will be readily apparent to those skilled in the art that additional components may also be included in the engine, such as, for example, low-pressure and high-pressure compressors, high-pressure and low-pressure turbines, and an external shaft. This, however, is not an exhaustive list. An engine also typically has an internal shaft axially disposed through a central longitudinal axis of the engine. The internal shaft is connected to both the turbine and the air compressor, such that the turbine provides a rotational input to the air compressor to drive the compressor blades. A typical gas turbine engine may also be considered to have an outer circumference with a central longitudinal axis therethrough.

Figure 1:
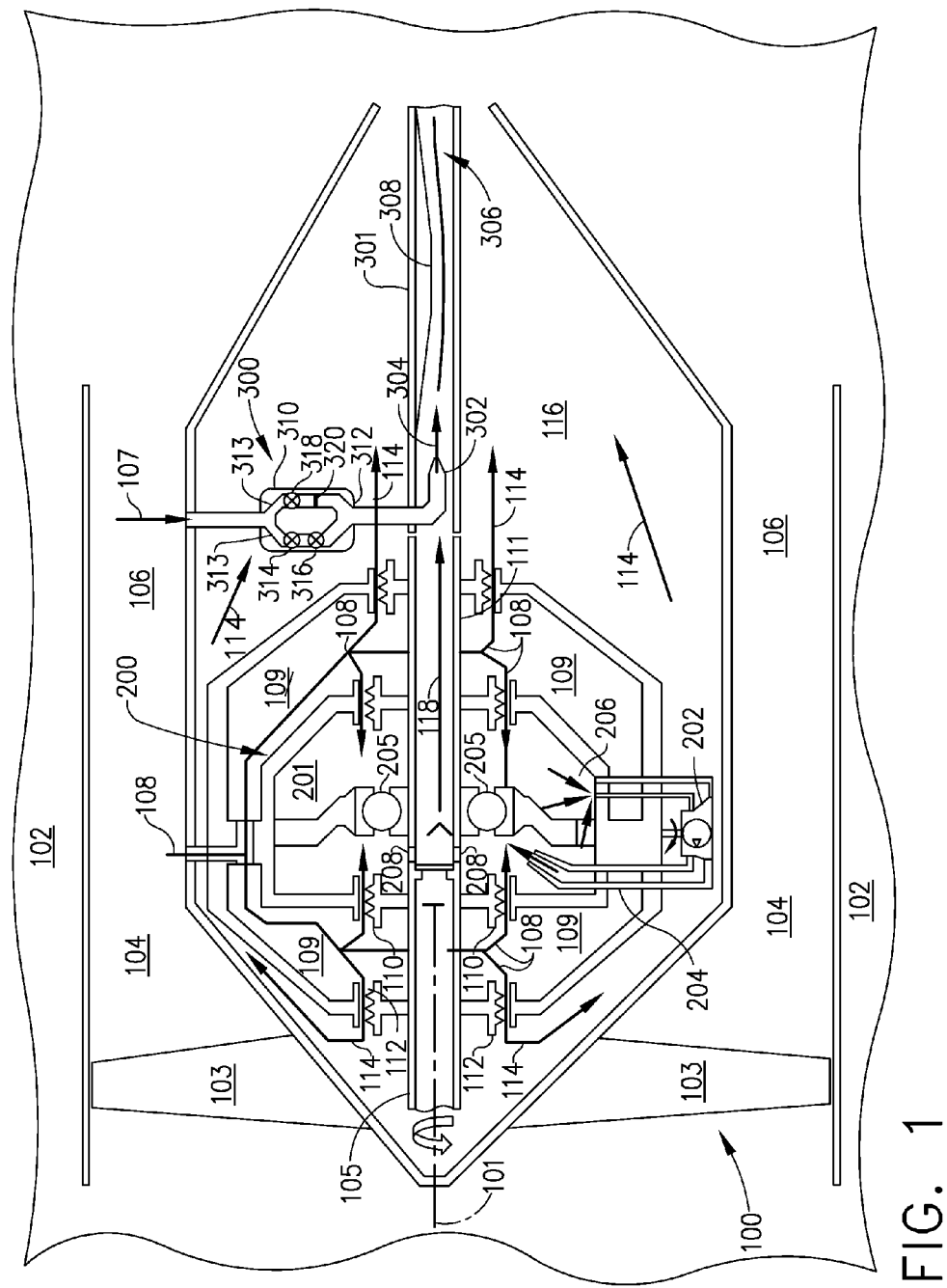
FIG. 1 is a schematic cross-sectional view of a gas turbine engine with a bearing sump provided with an embodiment of the present invention.

Referring now to FIG. 1, a schematic illustration of a gas turbine engine 100 cross-section is provided. The illustrated engine 100 may be utilized in a conventional jet aircraft. The engine 100 is provided with a central longitudinal axis 101 disposed therethrough. The engine 100 may be disposed in an environment 102 with ambient pressure and temperature conditions, which may be that found at the altitude in which the engine 100 is being utilized. A fan 103 may be provided at a forward end of the engine 100. Aft of the fan, the engine 100 is provided with a first zone 104 associated with a compressor containing a low pressure and low temperature fluid flow that supplies seal pressurization air 108. Aft of the first zone 104, the engine 100 is provided with a second zone 106 farther aft in the compressor containing a high pressure and high temperature fluid flow that supplies eductor supply air 107.

The seal pressurization air 108 is bled into and pressurizes a seal pressurization chamber 109, which houses a bearing sump and lubrication system 200. The sump system is provided with an oil wetted lubrication sump cavity 201. An oil pump 202 provides a pressurized oil supply 204 to lubricate a support bearing 205 for the shaft 105. Scavenge oil 206 is taken into the pump 202, pressurized, and fed back into the sump cavity 201 as the pressurized oil supply 204.

The sump cavity 201 is separated from the seal pressurization chamber 109 via a set of rotary sump cavity oil seals 110. The rotary oil seals 110 may be of any known variety, the shown example provides rotating labyrinth seals. Due to the nature of rotating labyrinth seals, seal pressurization air 108 from the first zone 104 can leak into the sump cavity 201 via the seal pressurization chamber 109 and through the rotary labyrinth seals 110. Thus, the sump cavity 201 is always in fluid communication with the first zone 104 via the rotary labyrinth seals 110.

The seal pressurization chamber 109 is also separated from the under-cowl 116 via a second set of rotary seals 112. Similar to the rotary sump cavity seals 110, the second set of seals 112 may be of any known variety, the shown example provides rotating labyrinth seals 112. Seal vent air 114 may leak through these rotary labyrinth seals 112 into the under-cowl 116, which is generally at ambient conditions.

If the pressure of the seal pressurization chamber 109 is lower than that of the sump cavity 201, then there will be a negative pressure differential between the seal pressurization chamber 109 and the sump cavity 201. Oil may leak out of the sump cavity 201 in this scenario, which may generally occur at low altitude and/or low power output of the engine 100. Therefore, an eductor system is provided to maintain the pressure of the sump cavity 201 lower than that of the seal pressurization chamber 109 such that there is a positive pressure differential between the pressurization chamber 109 and the sump cavity 201. When there is a positive pressure differential between the pressurization chamber 109 and the sump cavity 201, seal pressurization air 108 may flow into the sump cavity 201 and prevent oil from leaking out.

Figure 2:
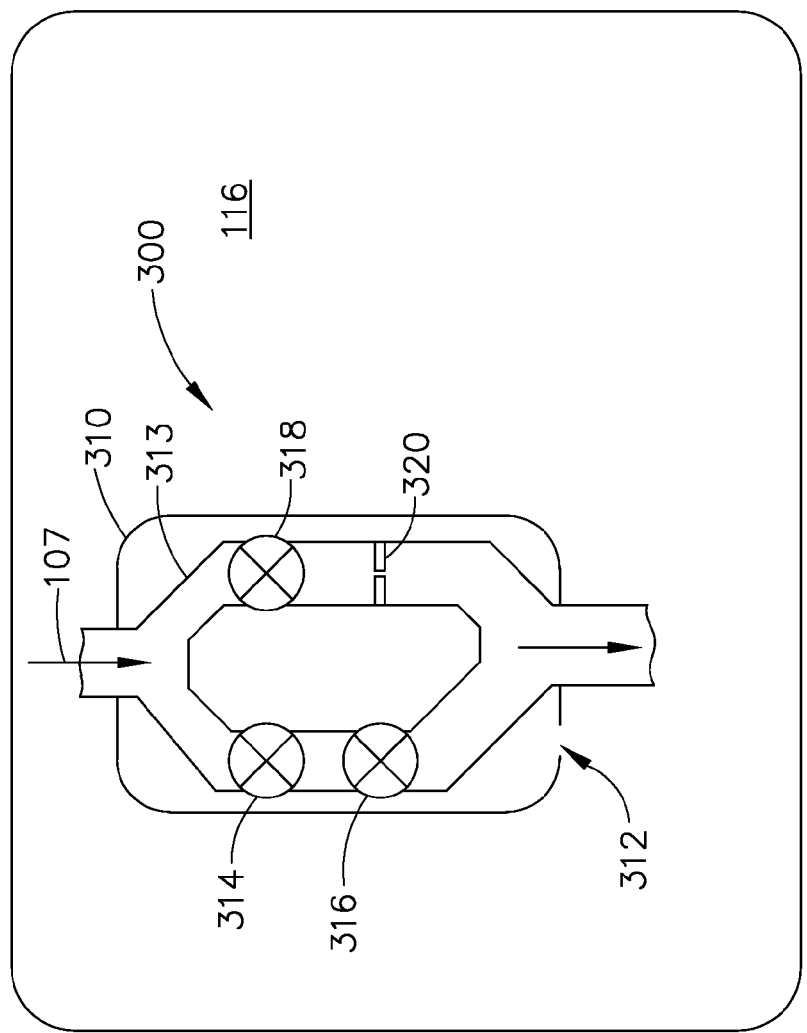
FIG. 2 is an embodiment of an adaptive eductor valve system.

With reference to FIGS. 1 and 2, the engine 100 is provided with an adaptive eductor system 300, also called an air jet ejector. The eductor system 300 may be in fluid communication with a stationary center vent tube 301 via an eductor nozzle 302. The bearing sump and lubrication system 200 is also provided with a sump vent 208 through a rotating center vent tube 111 as shown, or other known vent circuits. Sump vent air 118 passes through this vent tube 111, and into the stationary center vent tube 301, which houses the eductor nozzle 302.

When the eductor system is open, the eductor nozzle 302 ejects eductor bleed air 304 into the stationary vent tube 301 away from the sump vent 208 and into an eductor mixing section 306 having a constriction structure or constrictor 308. The constrictor 308 forms a nozzle in the stationary vent tube. The action of the nozzle ejecting eductor bleed air 304 away from the sump vent 208 and through the constrictor 308 creates low pressure suction that pulls sump vent air 118 from the sump cavity 201 through the sump vent 208. This suction creates a lower pressure in the sump cavity 201 than would otherwise prevail without the eductor system 300 and creates a positive pressure differential between the seal pressurization chamber 109 and the sump cavity 201. The lower sump cavity pressure allows the seal pressurization air 108 to enter the sump cavity to aid in preventing oil from leaking out of the sump cavity oil seals 110.

Referring to FIG. 2, an embodiment of an adaptive eductor system 300 will now be explained in detail. The eductor system 300 may be provided with a valve housing, which may have a vent hole 312 to the under-cowl environment 116 that is roughly at ambient pressure. The eductor system 300 may also be provided with an eductor fluid flow path 313 within the housing 310. The eductor flow path 313 is supplied with high pressure eductor air 107 from the second zone 106. Within this fluid flow path 313, a first gage pressure sensing valve 318, a second gage pressure sensing valve 314, and an altitude sensing valve 316 may be provided. The altitude sensing valve 316 may be provided in series through the fluid flow path 113 with the second gage pressure sensing valve 314. The first gage pressure sensing valve 318 may be provided in parallel through the fluid flow path 313 with the second gage pressure sensing valve 314 and the altitude sensing valve 316. In addition, an orifice restrictor 320 may be provided in series through the fluid flow path 313 with the first gage pressure sensing valve 318 and may be in parallel through the fluid flow path 313 with the second gage pressure sensing valve 314 and the altitude sensing valve 316. The gage pressure sensing valves 314, 318 measure and react to the pressure differential between the eductor supply air 107 and the under-cowl 116 environment, as it relates to the ambient conditions. Generally, the gage pressure read by the gage pressure sensing valves 314, 318 correlates to the power output of the engine 100.

The altitude sensing valve 316 may be open at and below a predetermined altitude and closed at all other conditions above that predetermined altitude. The first gage pressure sensing valve 318 may remain open at and below a first predetermined gage pressure and closed at all other conditions above that predetermined gage pressure. The second gage pressure sensing valve 314 may remain open at and below a second predetermined gage pressure and closed at all other conditions above that predetermined gage pressure. The second predetermined gage pressure may be different than the first predetermined gage pressure. Further, the second predetermined gage pressure may be greater than or equal to the first predetermined gage pressure.

When the engine 100 is operating at a low altitude, such as at ground level, and at low power, such as during ground idle or during landing approach, and the gage pressure is below both of the first and second predetermined gage pressures, all valves 314, 316, 318 remain open. With all the valves open 314, 316, 318, the eductor is on, which allows the eductor supply air 107 to freely flow through the eductor system 300 and out the eductor nozzle 302. Eductor bleed air 304 flowing out of the nozzle 302 creates a suction resulting in lower pressure at the sump vent 208, creating a positive pressure differential between the seal pressurization chamber 109 and the sump cavity 201.

The altitude sensing valve 316 closes when the engine is above the predetermined altitude. However, both of the first and second gage pressure sensing valves 314, 318 may remain open if the gage pressure is below the first predetermined gage pressure, such as that associated with low engine power. With the altitude sensing valve 316 closed and the first gage pressure sensing valve 318 open, the eductor supply air 107 is routed through the first gage pressure sensing valve 318 and through the orifice restrictor 320. The orifice restrictor 320 restricts supply air 107 flow such that the suction at the nozzle 302 is reduced as compared to the previous scenario. Under these conditions, a reduced suction is sufficient at the sump vent 208 to maintain the proper pressure differential in the sump cavity 201 than that required in the previous scenarios having the eductor system on. A restricted flow of supply air 107 requires less air to be drawn away from the engine and affects the power output of the engine less than had the supply air 107 been unrestricted and not routed through the orifice restrictor 320. Furthermore, the reduced suction may be required to ensure proper oil scavenge by the oil pump 202, which may cavitate at very low pressures at the pump 202 inlet.

At low altitudes and intermediate engine power, the altitude sensing valve 316 may remain open. However, both gage pressure sensing valves 314, 318 would be closed and the eductor 300 would be off. At a low altitude and a high engine power, such as that at take-off or the climb/ascent phase of a flight, the altitude sensing valve 316 would remain open, but both gage pressure sensing valves would be closed and the eductor 300 would be off. In such scenarios when the eductor 300 is off, it would not be needed to prevent oil leakage through the sump cavity oil seals 110.

At a high altitude, such as at cruising altitude and an engine power associated with cruising speed, the altitude sensing valve 316 and the first gage pressure sensing valve 318 would be closed. In such a scenario, the eductor system 300 would be off as it would not be needed to prevent oil leakage through the sump cavity oil seals 110.

Multiple variations are possible for the eductor system 300 disclosed herein. For instance, multiple predetermined gage pressure values are possible for both of the gage pressure sensing valve 314, 318. These pressure values may be determined by the design of the gas turbine engine 100 and its designed power output as well as the environment for which it is to be utilized.

Due to the orifice restrictor 320, multiple suction levels at the eductor nozzle 302 are possible. As shown in the examples above, a higher suction capacity is achievable at ground level than that achieved at altitude. The decreased suction at the eductor nozzle 302, due to the orifice restrictor 320, can be sufficient to aid in preventing oil leakage while also preventing oil pump cavitation at maximum altitude where minimum pressures are encountered.

Figure 3:
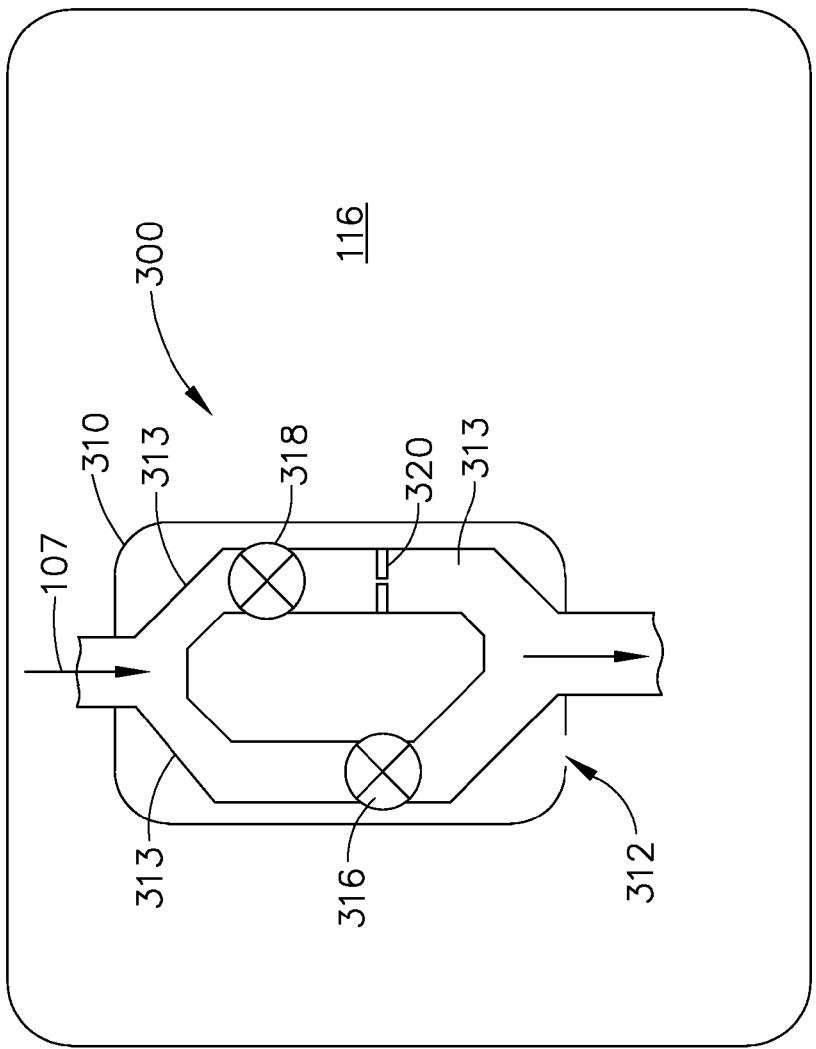
FIG. 3 is another embodiment of an adaptive eductor valve system, different than that shown in FIG. 2.

Furthermore, the eductor system 300 described herein may be employed with any and only one of the valves 314, 316, 318 described herein, or any and only two of the valves 314, 316, 318 described herein, or with or without the orifice plate 320. For instance, referring to FIG. 3, an adaptive eductor valve system 300 is shown possessing an altitude sensing valve 316 in parallel with a gage pressure sensing valve 318 and an orifice restrictor 320. It is to be understood that these embodiments that possess only two valves will respond differently than the disclosed three valve embodiment shown in FIGS. 1 and 2.

The disclosed embodiments may provide various improved engine system characteristics, such as, for example, improved performance, e.g., lower fuel consumption; lower emissions of oil, and nitric oxide and nitrogen dioxide; and a lower risk of oil scavenge pump cavitation.

The foregoing written description of structures and methods has been presented for purposes of illustration. Examples are used to disclose the invention, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An eductor for a gas turbine engine comprising:
a first zone having a first fluid flow at a first pressure;
a second zone having a second fluid flow at a second pressure;
a lubrication sump cavity in fluid communication with said first zone and a sump vent; and
an eductor valve system having a fluid flow path therethrough in fluid communication with said second zone and said sump vent, and comprising an altitude sensing valve and a gage pressure sensing valve.

2. The eductor for a gas turbine engine of claim 1, wherein said altitude sensing valve remains open at up to and below an altitude height and remains closed at all other conditions.

3. The eductor for a gas turbine engine of claim 1 further comprising:
an orifice plate in series through said fluid flow path with said gage pressure sensing valve.

4. The eductor for a gas turbine engine of claim 1 further comprising:
a second gage pressure sensing valve in series through said fluid flow path with said altitude sensing valve.

5. The eductor for a gas turbine engine of claim 4, wherein said gage pressure sensing valve remains open at and below a first gage pressure and remains closed at all other conditions.

6. The eductor for a gas turbine engine of claim 5, wherein said second gage pressure sensing valve remains open at and below a second gage pressure and remains closed at all other conditions.

7. The eductor for a gas turbine engine of claim 6, wherein said first gage pressure is less than or equal to said second gage pressure.

8. The eductor for a gas turbine engine of claim 4, wherein said gage pressure sensing valve and said second gage pressure sensing valve react to the gage pressure of said second zone.

9. An eductor for a gas turbine engine comprising:
a first zone having a first fluid flow at a first pressure;
a second zone having a second fluid flow at a second pressure;
a lubrication sump cavity in fluid communication with said first zone and a sump vent; and
an eductor valve system having a fluid flow path therethrough in fluid communication with said second zone and said sump vent, and comprising an altitude sensing valve in parallel through said fluid flow path with a gage pressure sensing valve.

10. The eductor for a gas turbine engine of claim 9, wherein said altitude sensing valve remains open at up to and below an altitude height and remains closed at all other conditions.

11. The eductor for a gas turbine engine of claim 9 further comprising:
an orifice restrictor plate in series with said gage pressure sensing valve.

12. The eductor for a gas turbine engine of claim 9 further comprising:
a second gage pressure sensing valve in series through said fluid flow path with said altitude sensing valve.

13. The eductor for a gas turbine engine of claim 9, wherein said gage pressure sensing valve remains open at and below a first gage pressure of said second zone and remains closed at all other conditions.

14. The eductor for a gas turbine engine of claim 13 further comprising:
a second gage pressure sensing valve in series through said fluid flow path with said altitude sensing valve;
wherein said second gage pressure sensing valve remains open and below a second gage pressure of said second zone and remains closed at all other conditions.

15. The eductor for a gas turbine engine of claim 14, wherein said first gage pressure is different than said second gage pressure.

16. The eductor for a gas turbine engine of claim 14, wherein said first gage pressure is less than or equal to said second gage pressure.

17. The eductor for a gas turbine engine of claim 14 further comprising a nozzle in fluid communication with said lubrication sump cavity through said sump vent and a vent tube.

18. An apparatus comprising:
a gas turbine engine having a low pressure compressor zone and a high pressure compressor zone;
said low pressure compressor zone having a fluid flow at a first pressure corresponding to a power output of said engine;
said high pressure compressor zone having a fluid flow at a second pressure corresponding to said power output of said engine;
a lubrication sump cavity in fluid communication with said low pressure compressor zone and a sump cavity vent; and
an eductor valve system having a fluid flow path therethrough in fluid communication with said high pressure compressor zone and said sump vent, and comprising an altitude sensing valve, a first gage pressure sensing valve, and a second gage pressure sensing valve;
wherein said altitude sensing valve is in parallel through said fluid flow path with said first gage pressure sensing valve; and
wherein said altitude sensing valve is in series through said fluid flow path with said second gage pressure sensing valve.

19. The apparatus of claim 18, wherein said first gage pressure sensing valve and said second gage pressure sensing valve react to the gage pressure of said second zone.

20. The apparatus of claim 18 further comprising an orifice restrictor in series through said fluid flow path with said first gage pressure sensing valve.

* * * * *